(12) United States Patent
Goldsmith

(10) Patent No.: US 6,767,455 B2
(45) Date of Patent: Jul. 27, 2004

(54) AIRLIFT MEMBRANE DEVICE AND MEMBRANE BIOREACTOR AND BIOREACTOR PROCESS CONTAINING SAME

(75) Inventor: Robert L. Goldsmith, Wayland, MA (US)

(73) Assignee: CeraMem Corporation, Waltham, MA (US)

( * ) Notice: Subject to any disclaimer, the term of this patent is extended or adjusted under 35 U.S.C. 154(b) by 0 days.

(21) Appl. No.: 10/261,107

(22) Filed: Sep. 30, 2002

(65) Prior Publication Data

US 2004/0035786 A1 Feb. 26, 2004

Related U.S. Application Data

(60) Provisional application No. 60/404,944, filed on Aug. 21, 2002.

(51) Int. Cl.[7] .............................. C02F 1/42; B01D 24/28
(52) U.S. Cl. .................. 210/151; 210/220; 210/500.23; 210/510.1
(58) Field of Search ................................ 210/151, 220, 210/500.23, 510.1

(56) References Cited

U.S. PATENT DOCUMENTS

| | | | | |
|---|---|---|---|---|
| 5,707,514 A | * | 1/1998 | Yamasaki et al. | ........... 210/151 |
| 6,284,135 B1 | * | 9/2001 | Ookata | ....................... 210/220 |

OTHER PUBLICATIONS

Mercier, M. et al., 1995, "Influence of the flow regime on the efficiency of a gas/liquid two–phase flow medium"; Biotechnol. Techniques, 9, 853–858.

Mercier, M. et al., 1997, "How slug flow can enhance the ultrafiltration flux in mineral tubular membranes"; J. Membrane Sci., 128, 103–113.

Mercier, M. et al.; 1998, "Yeast suspension filtration: flux enhancement using a gas/liquid upwards slug flow—Application to continuous alcoholic fermentation with cell recycle"; Biotechnol. Bioeng., 58, 47–57.

Leonard D., et al. 1998; A novel membrane bioreactor with gas/liquid two–phase flow for high performance degradation of phenol, Biotechnol. Prog., 14, 680–688.

Mercier–Bonin M. et al.; 2000, "Hydrodynamics of slug flow applied to crossflow filtration in narrow tubes"; AIChE Journal, 46 476–488.

Mercier–Bonin M. et al., 2000, "Influence of a gas/liquid two–phase flow on the ultrafiltration and microfiltration performances: case of a ceramic flat sheet membrane"; J. Membrane Sci., 180, 93–102.

In–Soung Chang et al.; 2002; "Air sparging of a submerged MBR for municipal wastewater treatment"; Process Biochemistry 37 (2002) 915–920.

(List continued on next page.)

Primary Examiner—Chester T. Barry
(74) Attorney, Agent, or Firm—Nields & Lemack

(57) ABSTRACT

A submerged, vertically-mounted membrane device, the device receiving a gas-sparged feed stock at a bottom feed inlet to provide airlift circulation of the feed stock through the device and separating the feed stock into filtrate and residual gas-containing retentate which passes from the top end of the device. The device comprises a structure of one or more monolith segments of porous material each monolith segment defining a plurality of passageways extending longitudinally from a bottom feed end face to a top retentate end face. A porous membrane is applied to the walls of the monolith segment passageways to provide a separating barrier. At least one filtrate conduit within the device carries filtrate from within the device toward a filtrate collection zone of the device, and the filtrate conduit provides a path of lower flow resistance than that of alternative flow paths through the porous material. A seal is provided to separate feed stock and retentate from the filtrate collection zone.

18 Claims, 6 Drawing Sheets

OTHER PUBLICATIONS

NAMS 2002; Nong Xu et al. "Design and Application of Airlift Membrane–Bioreactor for Municipal Wastewater Reclamation" Article.

Water Science & Technology vol. 41, No. 10–11 pp. 243–250; 2000; "Ultrafiltration of activated sludge with ceramic membranes in a cross–flow membrane bioreactor process"; X–j Fan et al.—English Abstract.

Steven Till et al.; "Membrane Bioreactors: Wastewater treatment applications to Achieve High Quality Effluent"; 64$^{th}$ Annual Water Industry Engineers and Operators' Conference; Sep. 5&6, 2001; pp–57–65.

Tsignhua Science and Technology; ISSN 1007–0214 08/17; pp. 283–287; vol. 5, No. 3, Sep. 2000; "Ceramic Ultra Filtration membrane Bioreactor for Domestic Wastewater Treatment"; Wen Xianghua et al.

Feature Article; Jun. 26, 2002; "Membrane Bioreactors: Design and Operation Options"; Professor A. Fane et al.

Session 6: Membrane bioreactors for Wastewater Treatment and Water Reclamation; "Applying Membrane Bioreactor Technology for Wastewater Treatment in the Netherlands" Helle F. Van der Roest.

Session 6: Membrane Bioreactors for Wastewater Treatment and Water Reclamation; "Applying Membrane Bioreactor Technology for Water Reclamation"; R. Rhodes Trussell et al.

Session 6: Membrane Bioreactors for Wastewater Treatment and Water Reclamation;"Case Study: Membrane Bioreactor Testing in Seattle, Washington"; Graham J.g. Juby et al.

* cited by examiner

AIRLIFT MEMBRANE DEVICE AND MEMBRANE BIOREACTOR AND BIOREACTOR PROCESS CONTAINING SAME

This application claims priority of provisional patent application Serial No. 60/404,944 filed on Aug. 21, 2002, the disclosure of which is hereby incorporated by reference.

FIELD OF THE INVENTION

This invention relates to an airlift membrane device, an airlift membrane bioreactor containing same, and an airlift bioreactor process. The membrane device utilizes one or more multiple passageway porous monoliths as a microfiltration or ultrafiltration membrane support. The monolith-based membrane device provides a compact, low cost device that has well-controlled and efficient airlift for membrane flux maintenance. The use of a ceramic membrane offers a hydrophilic membrane resistant to fouling by the bioreactor biomass feed stock.

BACKGROUND AND PRIOR AND RELATED ART

The rapid emergence of the membrane bioreactor (MBR) has lead to the deployment of several types of membrane devices in such MBR's, in both "submerged membrane" and pumped "external loop" membrane module configurations. For the submerged membrane configuration, which is favored due to lower costs, there are primarily two membrane types employed: polymeric hollow fibers and polymeric plate devices. Descriptions of the state of the art for both submerged and external loop technology can be found in the following:

1. Articles in the June 2002 issue of Filtration+Separation, Vol. 39, no. 5, pages 26–35.
2. Proceedings of the Microfiltration III Conference, Costa Mesa, Calif., May 5–7, 2002.
3. "Membrane Bioreactors: Wastewater Treatment Applications to Achieve High Quality Effluent", by Steven Till and Henry Mallia, presented at the 64$^{th}$ Annual Water Industry Engineers and Operators' Conference, Sep. 5–6, 2001, Bendigo, Australia.

The last paper describes the two leading submerged systems, hollow fibers sold by Zenon (Canada) and plate devices sold by Kubota (Japan). The invention that is the subject of this patent application and that can be used in a submerged MBR is a substantially different membrane configuration, viz. a multiple passageway monolith membrane device. The structures covered by this invention have the characteristics of intrinsically low cost and a very high membrane surface area per unit volume of the device.

Similar devices in various structures when used as cross-flow membrane modules, as could be used in external loop MBR's, have been disclosed in the following patents, specifically incorporated herein by reference:

1. U.S. Pat. No. 4,781,831 (Goldsmith), which discloses in FIG. 5 therein, and described in the patent Specification, a cluster of individual multiple passageway monoliths arranged to have "filtrate flow conduits" formed by the space among the monolith elements.
2. U.S. Pat. No. 5,009,781 and U.S. Pat. No. 5,108,601 (Goldsmith), which therein disclose in the Figures and Specification unitary monolith structures with filtrate conduits formed within the monoliths.
3. U.S. Pat. No. 6,126,833 (Stobbe, et al.), which discloses structures comprised of a collection of monolith segments containing both segment internal filtrate conduits and a filtrate conduit arrangement formed by the gap among the monolith segments.

Preferred embodiments of the monolith based membrane device would be fabricated from a porous ceramic monolith support and a finer-pored ceramic or polymeric membrane coating applied to the passageway wall surfaces of the monolith support.

Ceramic membrane microfiltration (MF) and ultrafiltration (UF) devices have been used in external MBR systems. Examples are found in an article by Wen, Xing, and Qian ("Ceramic Ultra Filtration Membrane Bioreactor for Domestic Wastewater Treatment", Tsinghau Science and Technology, ISSN 1007-0214, 08/17, Vol. 5, No. 3, pp 283–287 (September 2000)) and an article by Fan, Urbain, Qian, and Manem ("Ultrafiltration of Activated Sludge with Ceramic Membranes in a Cross-Flow Membrane Bioreactor Process", Water Science & Technology, Vol. 41, No. 10–11, pp 243–250 (2000)).

There has been little work using ceramic membranes in a submerged MBR configuration. A recent presentation by Xu, Xing, and Xu entitled "Design and Application of Airlift Membrane-Bioreactor for Municipal Wastewater Reclamation" describes the use of an airlift MBR using single tubular ceramic UF membrane elements and a five (5) channel multichannel UF membrane element (Presentation at the North American Membrane Society Meeting, May 11–15, 2002, Long Beach, Calif.).

SUMMARY OF THE INVENTION

This device features a submerged, vertically-mounted airlift membrane device. The device comprises a structure of one or more monolith segments of porous material, each monolith segment defining a plurality of passageways extending longitudinally from a bottom feed end face to a top retentate end face. The surface area of the passageways in the monolith segment is at least 150 square meters per cubic meter of monolith segment volume, and the porous material has a porosity of at least 30% and a mean pore size of at least 3 µm porous membrane with mean pore size below 1 µm is applied to the walls of the monolith segment passageways to provide a separating barrier. A gas sparger is located below the device to provide a gas-sparged liquid feed stock at the bottom end face to provide airlift circulation of the feed stock through the device, which separates the feed stock into filtrate and a residual gas-containing retentate that passes from the top end face of the device. At least one filtrate conduit is formed within the device for carrying filtrate from within the device toward a filtrate collection zone of the device, the filtrate conduit providing a path of lower flow resistance than that of alternative flow paths through the porous material. The device has at least one seal to separate feed stock and retentate from the filtrate collection zone.

In a preferred embodiment, the porous material of the membrane device is ceramic. The device structure can be comprised of a single monolith or an assembly of monolith segments. The membrane device can be contained in a housing for filtrate collection and the filtrate collection zone is the annular space between the device and the housing. Alternatively, the device can be isolated along the exterior surface and the filtrate can be withdrawn from an end face of the device.

The membrane used in the device can be a microfiltration membrane with a pore size from about 0.1 to about 1 micron or an ultrafiltration membrane with a pore size from about 5 nm to about 0.1 micron. Preferably, the membrane is a ceramic membrane.

The vertically mounted membrane device can contain a shroud extending below the bottom end face of the device and the gas is sparged into a cavity created by the shroud. Preferably, the hydraulic diameter of the passageways is from about 4 to 15 mm and the preferred hydraulic diameter of the monolith segments is greater than about 50 mm.

This membrane device can be used in a membrane bioreactor that includes, in addition to the cross flow membrane device, a membrane bioreactor feed tank with means of introduction of a liquid feed stock and a means to convey the filtrate from the filtrate collection zone of the device to the filtrate discharge point of the bioreactor.

The membrane device can be installed within a bioreactor feed tank in an internal airlift circulation loop, or it can installed external to the feed tank in an external airlift circulation loop. The sparged gas can be air or oxygen and the bioreactor can operate under aerobic conditions, or the sparged gas can have low or negligible oxygen content and the bioreactor can operate under anaerobic conditions.

This invention further features a bioreactor process that includes introducing a feedstock into a submerged airlift membrane bioreactor. Gas is sparged at a bottom feed inlet of at least one submerged, vertically-mounted membrane device to provide airlift circulation of the feedstock through the device, and the feed stock is separated into filtrate and residual gas-containing retentate which passes from the top end of the device. The device consists of a structure of one or more monolith segments of porous material each monolith segment defining a plurality of passageways extending longitudinally from a bottom feed end face to a top retentate end face, the surface area of the passageways in the monolith segment being at least 150 square meters per cubic meter of monolith segment volume. The porous material has a porosity of at least 30% and a mean pore size of at least 3 $\mu$m and a porous membrane with mean pore size below 1 $\mu$m is applied to the walls of the monolith segment passageways to provide a separating barrier. At least one filtrate conduit within the device carries filtrate from within the device toward a filtrate collection zone of the device, and the filtrate conduit provides a path of lower flow resistance than that of alternative flow paths through the porous material. The device has a means to separate feed stock and retentate from the filtrate collection zone. The filtrate collected in the filtrate collection zone is conveyed to the filtrate discharge point of the bioreactor.

DETAILED DESCRIPTION OF INVENTION

Figure 1:
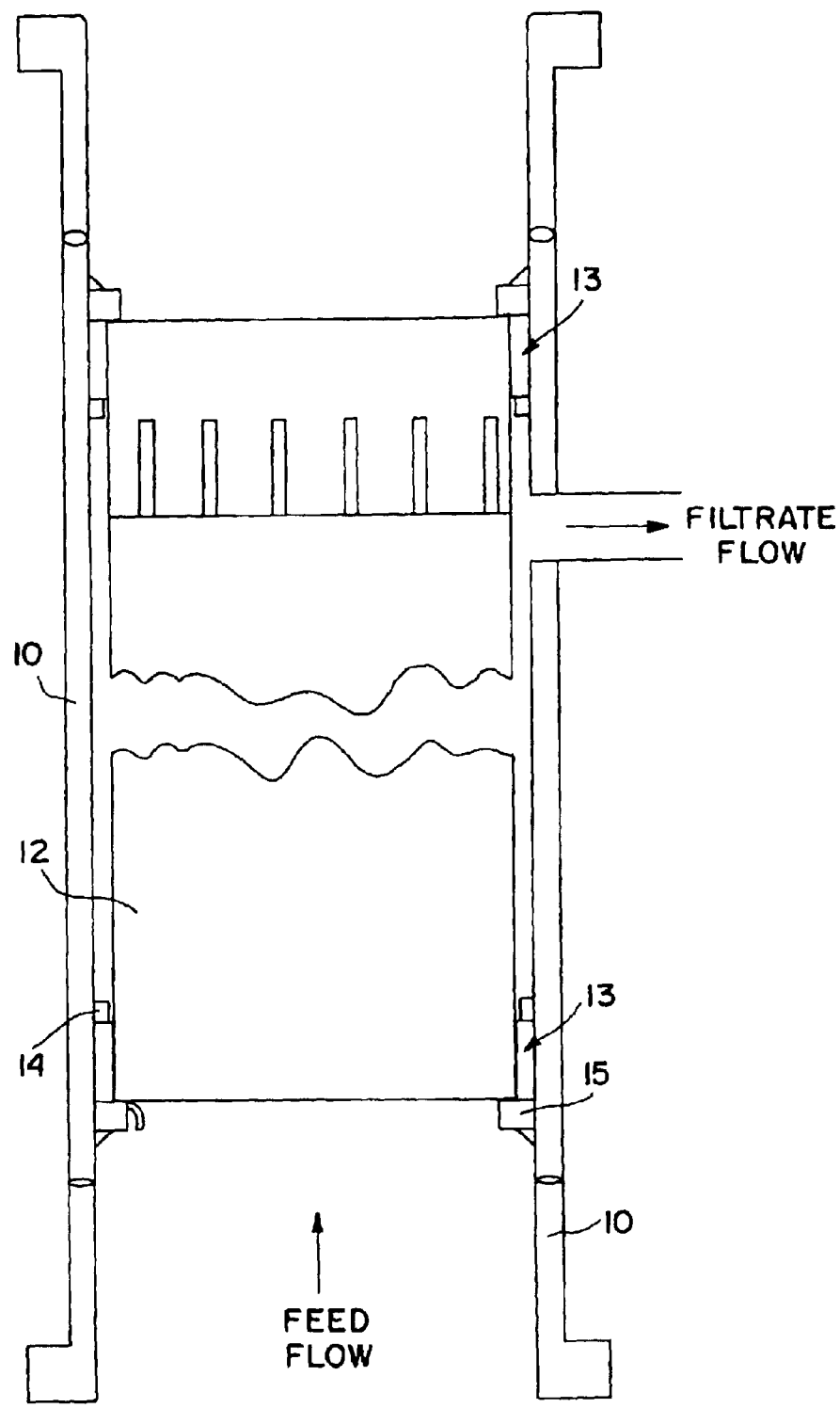
FIG. 1 is a cross-sectional view of a potted membrane element in an enclosing housing in accordance with an embodiment of the present invention.

The description which follows focuses on an airlift MBR. However, the membrane element that is the subject of the present invention can be used for any pressure-driven membrane process in which a liquid feed stock is separated into filtrate and retentate streams. The transmembrane pressure driving force can be applied by using a filtrate pump to create a filtrate pressure below that of the pressure of the feed stock. Alternatively, the filtrate can be withdrawn at a location physically below the level of the membrane element, in which case the elevation of the membrane element higher than the withdrawal point of the filtrate creates a gravity head transmembrane pressure. While processes in which the feed stock is essentially at atmospheric pressure are envisioned, a pressurized feed stock can also be used to create the necessary transmembrane pressure. Membrane processes for which this invention is especially applicable include microfiltration and ultrafiltration. However, if the necessary transmembrane pressure can be generated, the invention could be used for nanofiltration and reverse osmosis.

The present invention recognizes the potential use of large diameter monolith membrane devices in a submerged, airlift MBR, taking into account important requirements for an airlift MBR, viz.

1. Operation of the MBR at a relatively low transmembrane pressure (TMP), and the resultant requirement of having a monolith membrane support and membrane coating with high permeability;
2. Operation of the MBR with a high level of suspended solids (e.g., 10,000–20,000 mg/l), which can plug passageways below a minimum dimension; and
3. The need to have a membrane with a pore size sufficiently small to efficiently retain the MBR biomass.

In the present invention, one or more porous honeycomb monolith segments are used as membrane supports. The monolith material is preferably a ceramic, but can also be a porous metal, plastic, filled resin, resin-bonded glass or sand or metal, or other composites. For ceramics, preferred materials have been disclosed in the US Patents of Goldsmith and Stobbe, et al., cited above, as well as the reaction bonded alumina monolith disclosed in U.S. patent application Ser. No. 10/097,921 filed Mar. 13, 2002, the disclosure of which is hereby incorporated by reference.

The monoliths can have a circular, square, hexagonal, rectangular, triangular or other cross-section. The passageway hydraulic diameter should be 2 mm or greater, preferably in the range of about 4 to 15 mm, selected to be sufficiently large so as to resist blockage by solids under operating conditions in an airlift MBR. The monolith porosity should be greater than 30%, preferably greater than 40% to maximize permeability. The monolith passageway wall thickness should be sufficiently high to provide adequate strength and permeability, but not so high so as to deleteriously reduce the passageway wall area per unit volume. Typically, the monolith passageway wall thickness would be between 20% and 40% of the passageway hydraulic diameter. To minimize costs of the device, the hydraulic diameter of the monolith should be relatively large, preferably greater than about 50 mm.

The structure of the monolith support can be as disclosed in the cited patents of Goldsmith and Stobbe, et al. These include a single monolith with internal filtrate conduits, an assembly of monolith segments with the filtrate conduit formed by the space among segments, and the same with the segments having one or more internal filtrate conduits.

The monolith support (or supports) can be coated with a MF membrane or a UF membrane. The membrane could be ceramic, polymeric, or metallic. Membrane coating materials and procedures for coating tubular and monolith supports are well known in the membrane art. One category of preferred membranes includes MF membranes which have a pore size in the range of about 0.1 to 0.5 $\mu$m, and which are capable of having very high retention efficiency for microorganisms. A second type of membrane that can be employed is an UF membrane, with a pore size in the range of about 0.01 to 0.1 $\mu$m and which can also retain viruses with high efficiency.

Figure 2:
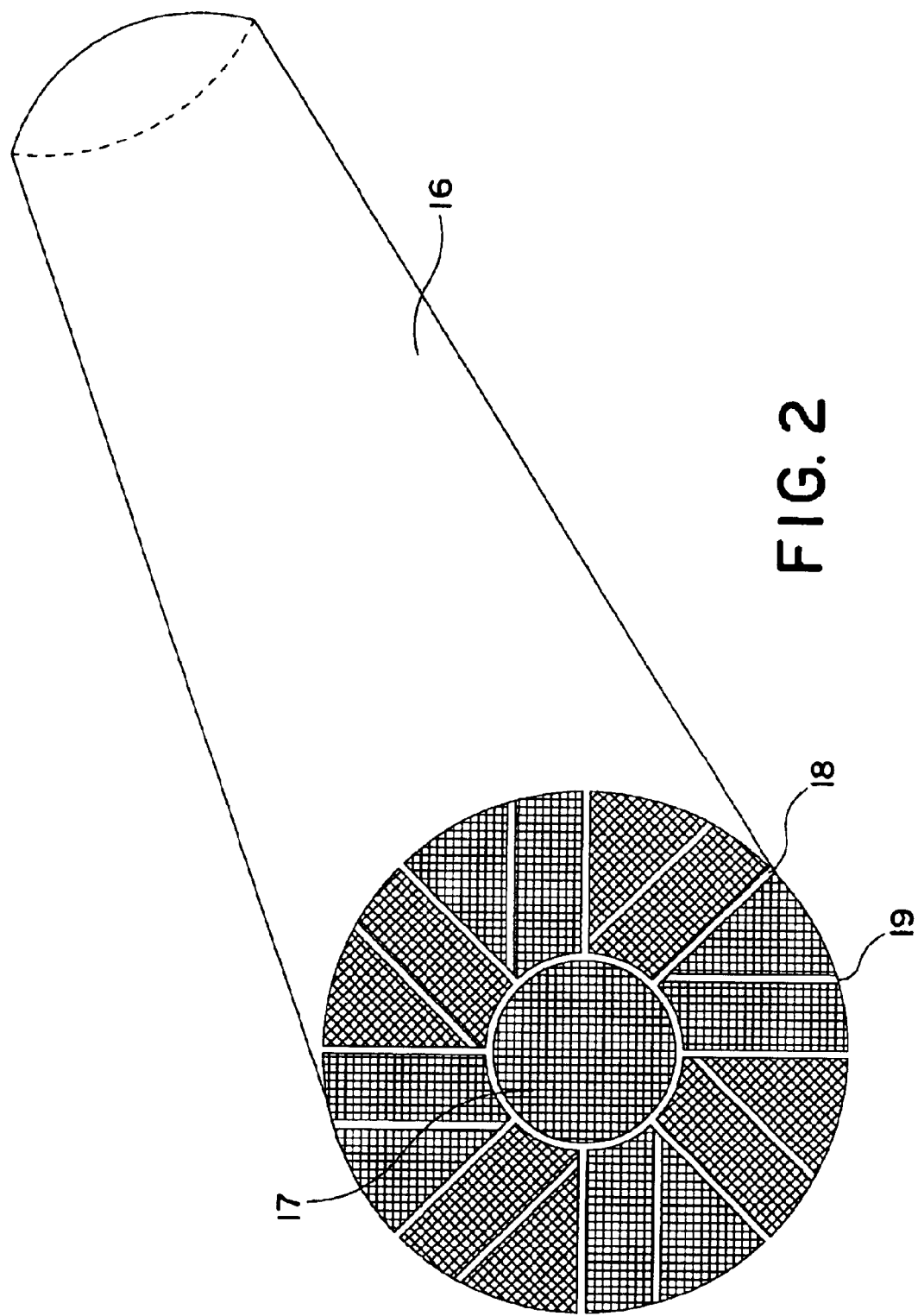
FIG. 2 is a perspective view of a segmented structure assembled around a central cavity in accordance with an embodiment of the present invention.

The single or multiple monolith segment device, after coating with a membrane, becomes a membrane element that must be configured with a means to separate filtrate from the MBR feed contents. For the honeycomb monolith membrane element structures, means of filtrate withdrawal have been disclosed in the patents of Goldsmith, cited above and included herein by reference. One means is withdrawal of filtrate from along the sides of the monolith membrane element into an enclosing housing. One simple means to accomplish this is to pot the membrane element into a housing. As shown in FIG. 1, an individual filter element 12 with internal filtrate conduits is potted into a housing 10 with potting compound 13. The housing 10 includes a standoff ring 14 and a support ring 15 as shown. Another method of filtrate withdrawal is to extract filtrate from an end face of the membrane element. This can be accomplished, for example, with the segmented structures of Stobbe, et al., with the filtrate collection tubes of Goldsmith (U.S. Pat. No. 5,009,781), and to withdraw the filtrate from an end face of a multi-segment element. Such a structure is illustrated in FIG. 2. In this example, "ring segments" 16 (eight shown) with their external surface sealed are assembled around a central cavity 17 for filtrate withdrawal. The segments 16 are wrapped with an impermeable sleeve or otherwise sealed to hold the assembly together and to prevent filtrate from exiting at the lateral circumferential surface of the structure. The central cavity 17 is connected to a filtrate withdrawal tube(scaled in the cavity 17 but not shown), which need not run the length of the structure. The intersegment portion 18 and intrasegment portion 19 of the filtrate conduit are sealed at the end faces. The assembled segmented structure is appropriately sealed at the ends to prevent contamination of the filtrate by feed wastewater. The filtrate withdrawal tube can also serve as a mechanical support for the membrane element mounted vertically in a MBR waste treatment tank.

Structures of the type described above can have a very high membrane packing density. For example, for different passageway sizes and monolith wall thicknesses, assuming 80% utilization of the passageways for contacting a feed stock, the packing densities of Table 1 are achievable.

TABLE 1

Properties of Monolith Based Membrane Devices

| Passageway size, mm | Wall thickness @ 25%, mm | Percentage passageways used for Feed stock passageways | Approximate Membrane area/volume, sq m/cu m |
|---|---|---|---|
| 4 | 1 | 80% | 510 |
| 6 | 1.5 | 80% | 340 |
| 8 | 2 | 80% | 255 |
| 10 | 2.5 | 80% | 205 |
| 12 | 3 | 80% | 170 |

A membrane element, provided with a means to separate filtrate and feed wastewater and a means to withdraw filtrate to an exterior point becomes a membrane device. The necessary transmembrane pressure (TMP) to drive filtrate can be achieved by either of the means normally employed in other submerged MBR's, viz. gravity head or a filtrate pump which pulls a partial vacuum on the filtrate side of the device.

Figure 3A:
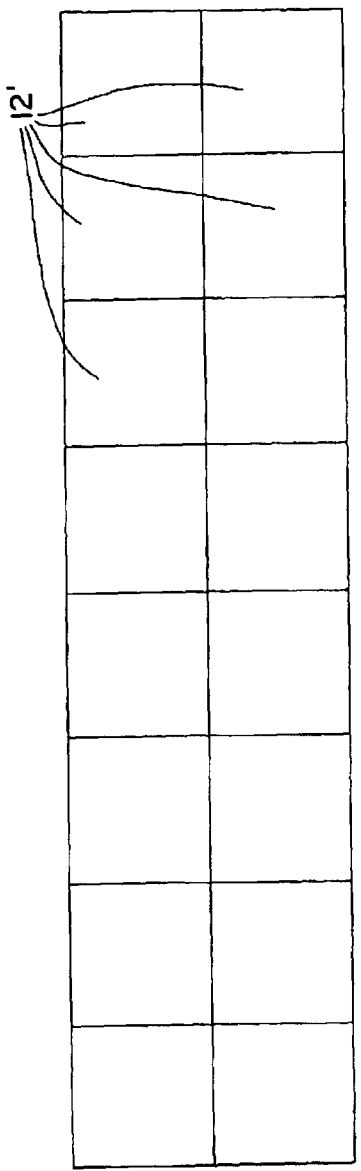
FIGS. 3a and 3b are top views of multiple membrane devices mounted vertically in a membrane bioreactor wastewater tank in accordance with an embodiment of the present invention.
Figure 3B:
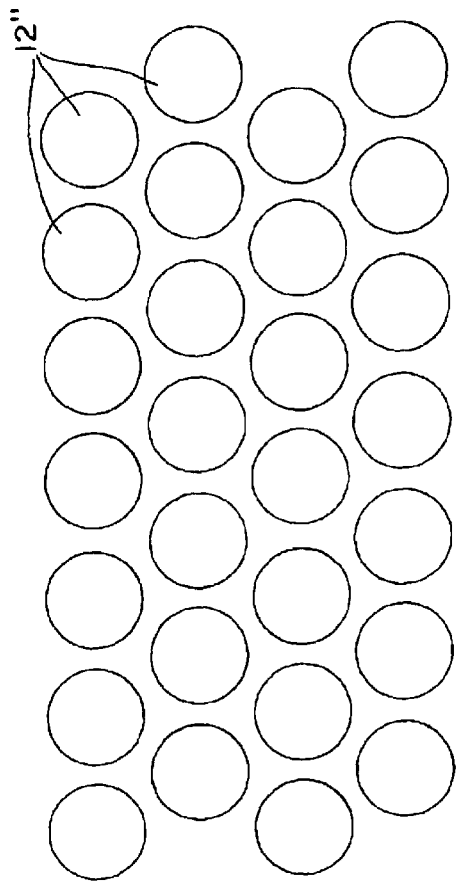
Figure 4:
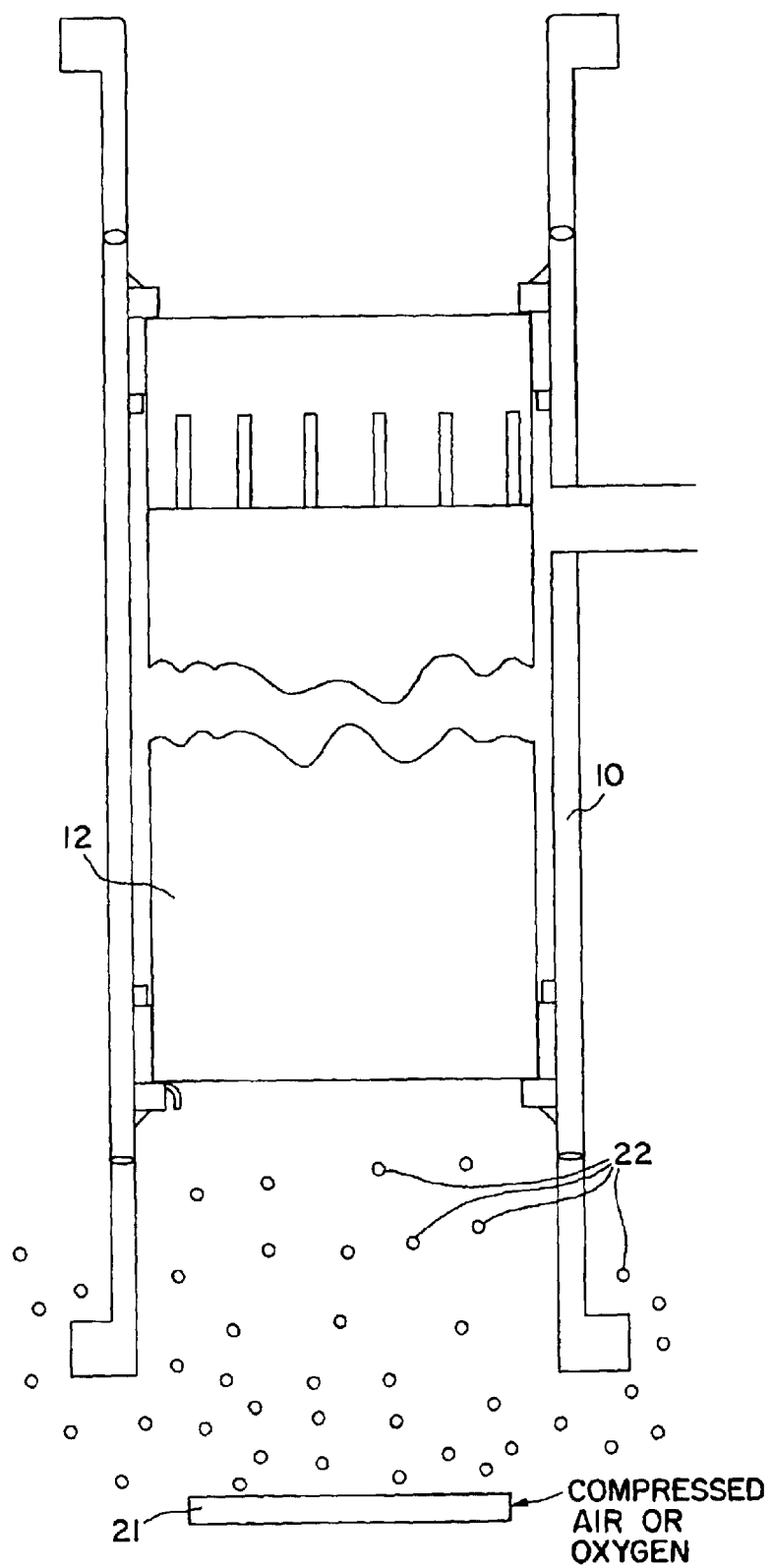
FIG. 4 is a cross-sectional view of an aerobic membrane bioreactor wherein air is sparged at the bottom ends of the membrane devices in accordance with an embodiment of the present invention.
Figure 5:
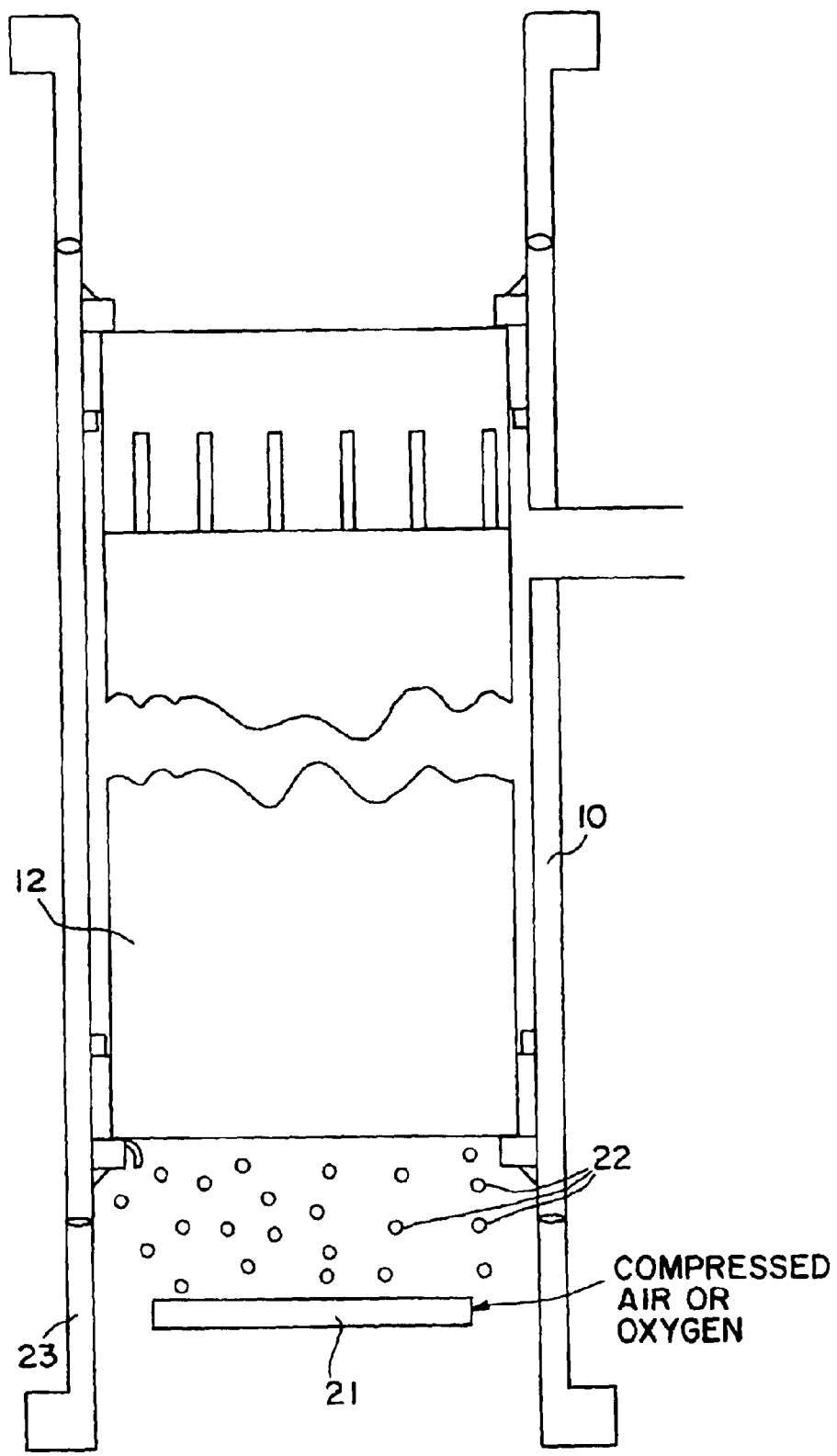
FIG. 5 is a cross-sectional view of an aerobic membrane bioreactor wherein air is sparged within shrouds at the bottom ends of the membrane devices in accordance with an embodiment of the present invention.

Multiple membrane devices can be mounted vertically in a MBR wastewater tank in a closely packed array, such as shown in FIGS. 3a and 3b. FIG. 3a illustrates a 2×8 array of square filter elements 12'. The elements can have filtrate withdrawn from the side of the enclosure (not shown) or end tubes can be connected to internal filtrate collection cavities. FIG. 3b illustrates a 4×7 array of round filter elements 12". The elements can have filtrate withdrawn from individual housing shells or end tubes from the top or bottom end faces. For an aerobic MBR, air (or oxygen) is sparged at the bottom ends of the membrane devices with a suitable sparger 21 in communication with a source of compressed air or oxygen and the rising gas 22 provides the airlift for liquid flow through the passageways and oxygen for the biological oxidation process (FIG. 4). It is possible to provide shrouds 23 around the lower part of the membrane devices and to have the air (or oxygen) sparged within the shroud to insure that all sparged gas will flow up through the device passageways (FIG. 5). This will provide the most efficient means of air or oxygen introduction in terms of efficient airlift mass transfer within the membrane devices since all of the gas will flow through the membrane devices with negligible bypassing as found, especially, in hollow fiber MBR contactors.

The same membrane device can be used for an anaerobic MBR, sparging with inert gas or a gas with low oxygen content.

Figure 6:
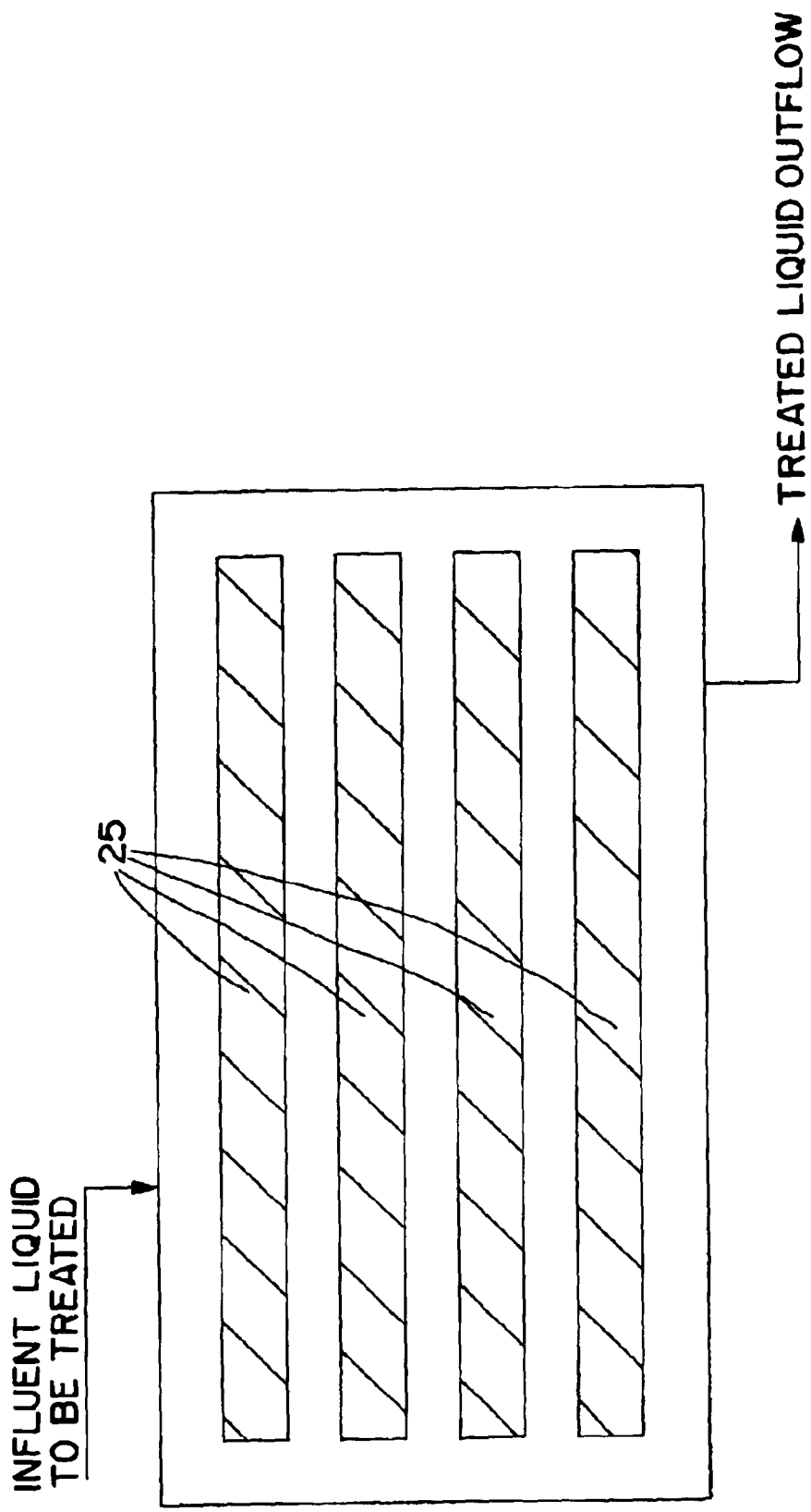
FIG. 6 is a top view of banks of membrane modules in a bioreactor tank in accordance with an embodiment of the present invention.
Figure 1:
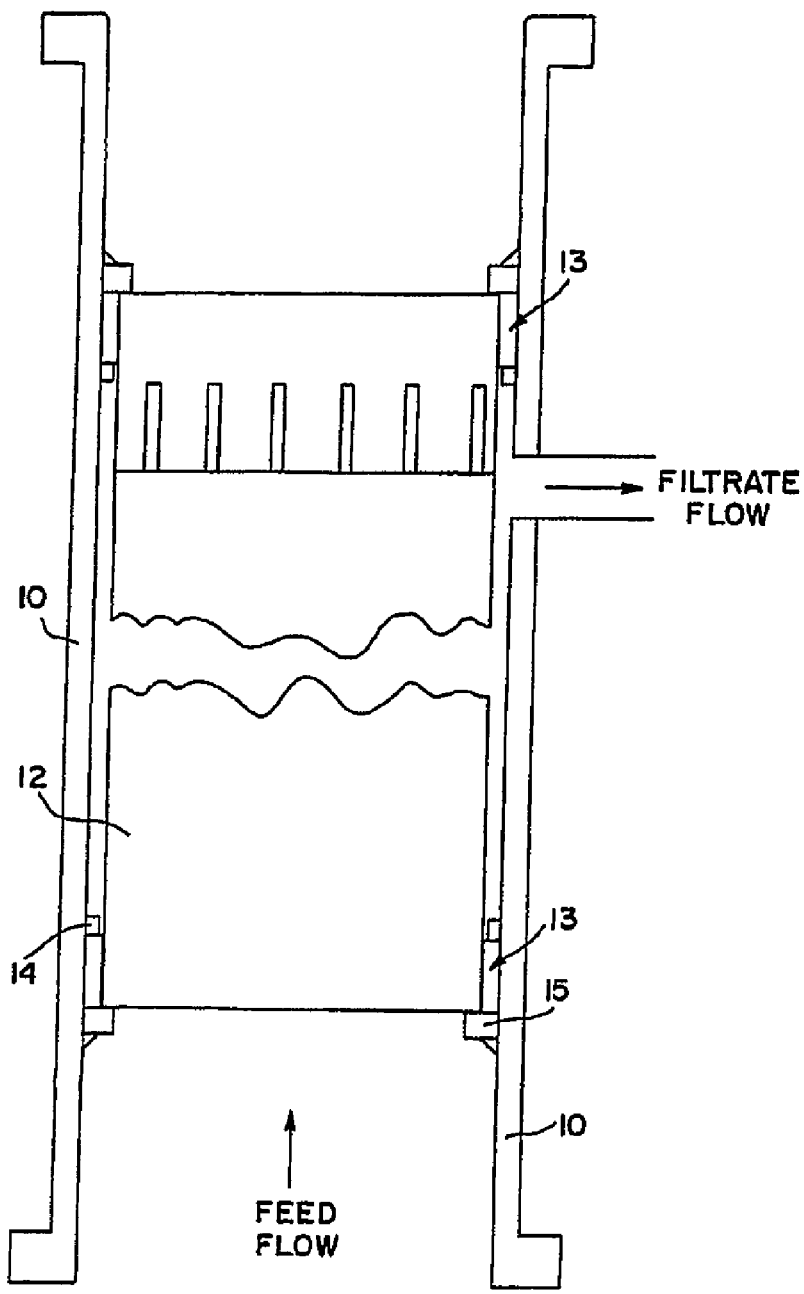
Figure 4:
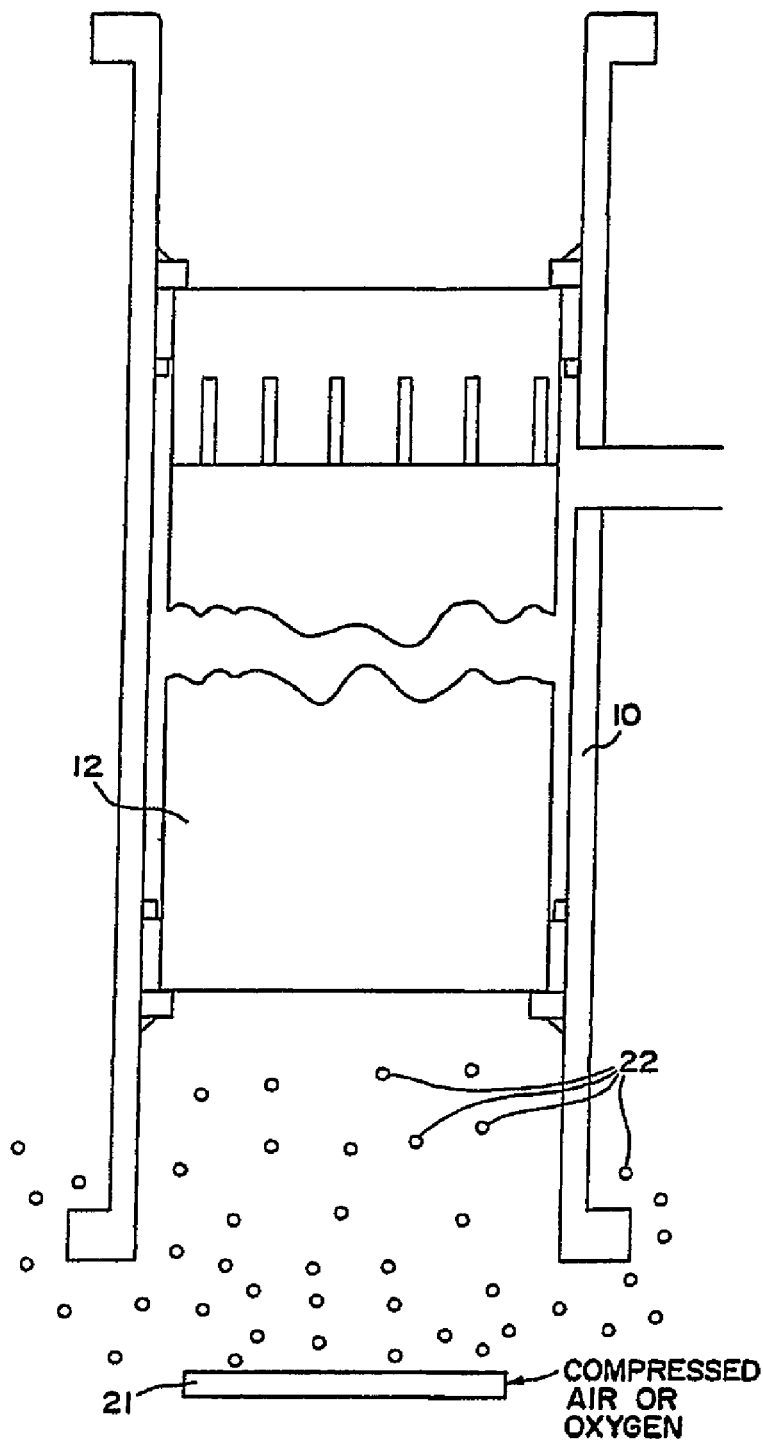
Figure 5:
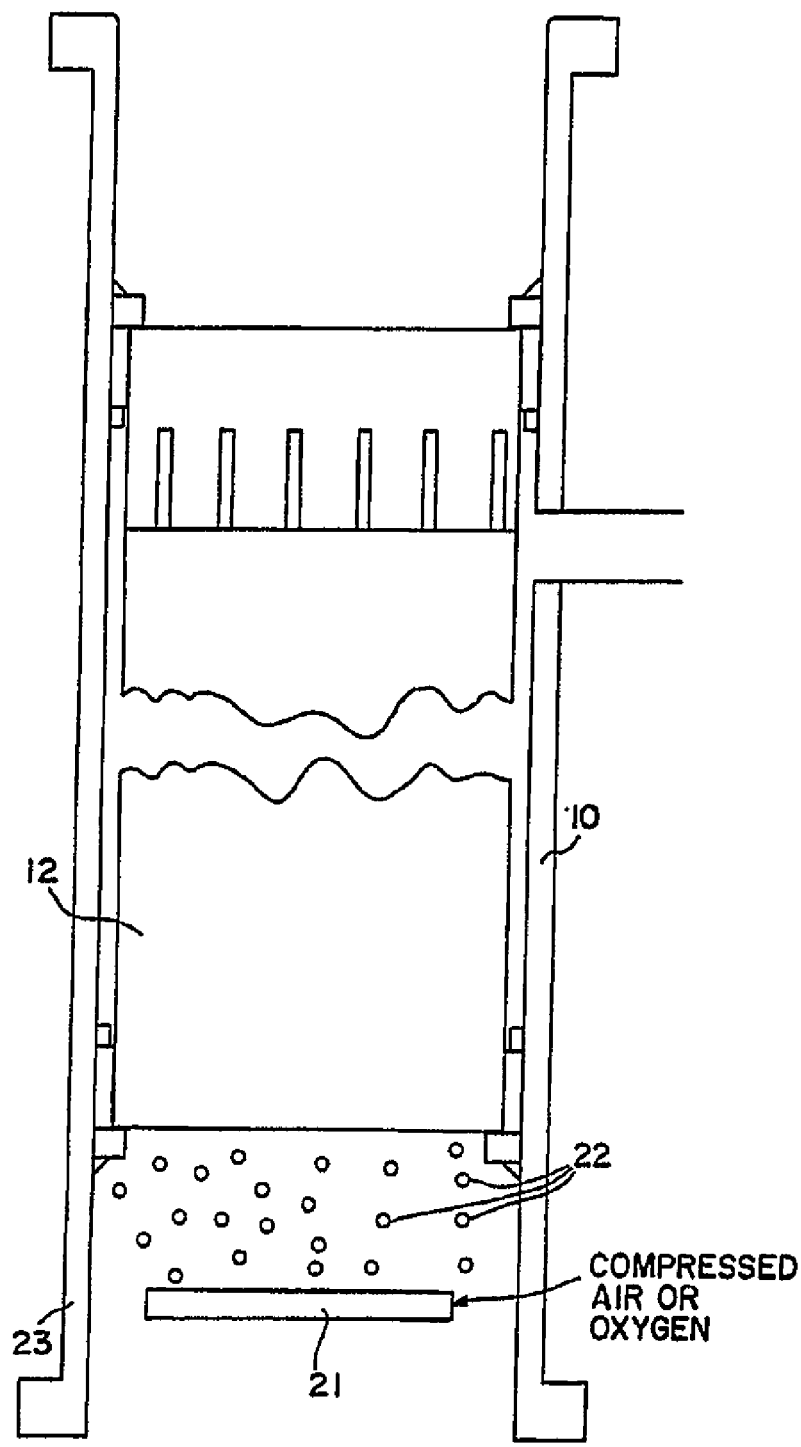

The arrangement of membrane devices, as shown in FIG. 6, has the spacing among banks of membrane devices 25 available for liquid downflow after disengagement of the gas and liquid at the top of the devices. The banks 25 are separated by open spaces for deaerated liquid downflow. Filtrate withdrawal depends on whether housings or internal cavities are used to remove filtrate. Aeration sparger(s) at the bottom of the device are not shown.

The advantages of the subject invention include the following. First, the compactness of the membrane devices provides a very high membrane area per unit volume of the submerged MBR reactor, comparable to those of hollow fiber and plate MBR's. Second, the hydrodynamic control of liquid in the device passageways will promote very high mass transfer, uniform throughout the device. The use of shrouds will insure all gas introduced is used for efficient airlift. This should provide high membrane flux and low compressed gas power per unit flux relative to other membrane devices. A preferred membrane will be ceramic, which will be very rugged and mechanically durable, and can be expected to have a long life relative to polymeric membranes used in hollow fiber and plate configurations. For ceramic membranes, in particular, it is possible to apply membrane coatings which are highly hydrophilic and will be weakly adsorptive of organic contaminants present in MBR's. This will reduce fouling and improve effectiveness of chemical cleaning. The devices are capable of cleaning by pressurized filtrate backflushing, pressurized gas backflushing, chemical solution backflushing, and circulation of chemical cleaning solutions in a normal operating mode, especially when operating without filtrate withdrawal. Cleaning agents can include acids, caustic and oxidants such as hypochlorite.

The use of large diameter monolith devices, as disclosed herein, is conducive to production of ceramic membrane devices that can be cost competitive with lost cost polymeric membranes. While the membrane devices may be more costly than polymeric hollow fibers per unit membrane area, the anticipated advantages of higher membrane flux, lower power consumption, and longer membrane life will offset a higher membrane area cost.

As an alternative to immersion of the membrane devices in the MBR feed tank, they can be utilized in an external airlift circulation mode. In this arrangement, the membrane devices are mounted external to the feed tank and the airlift gas in the membrane devices creates circulation between the feed tank and the external membrane devices.

Although specific features of the invention are described in various embodiments, this is for convenience only as each feature may be combined with any or all of the other features in accordance with the invention. Other embodiments will occur to those skilled in the art and are within the scope of the following claims:

What is claimed is:

1. A submerged, vertically-mounted airlift membrane device comprising:
    a structure of one or more monolith segments of porous material, each monolith segment defining a plurality of passageways extending longitudinally from a bottom feed end face to a top retentate end face, the surface area of the passageways in the monolith segment being at least 150 square meters per cubic meter of monolith segment volume;
    said porous material having a porosity of at least 30% and a mean pore size of at least 3 microns;
    a porous membrane with mean pore size below 1 micron applied to the walls of the monolith segment passageways to provide a separating barrier;
    a gas sparger located below the device to provide a gas-sparged liquid feed stock at the bottom end face to provide airlift circulation of feed stock through the device, which separates the feed stock into filtrate and residual gas-containing retentate which passes from the top end face of the device;
    at least one filtrate conduit within the device for carrying filtrate from within the device toward a filtrate collection zone of the device, the filtrate conduit providing a path of lower flow resistance than that of alternative flow paths through the porous material; and
    at least one seal to separate feed stock and retentate from the filtrate collection zone.

2. The device of claim 1 in which the porous material is ceramic.

3. The device of claim 1 in which the structure is comprised of a single monolith.

4. The device of claim 1 in which the structure is comprised of an assembly of monolith segments.

5. The device of claim 1 in which the structure is contained in a housing for filtrate collection and the filtrate collection zone is the annular space between the device and the housing.

6. The device of claim 1 in which the structure is sealed along the exterior surface and the filtrate is withdrawn from an end face.

7. The device of claim 1 in which the membrane is a microfiltration membrane with a pore size from about 0.1 to about 1 micron.

8. The device of claim 1 in which the membrane is an ultrafiltration membrane with a pore size from about 5 nm to about 0.1 micron.

9. The device of claim 7 in which the membrane is a ceramic membrane.

10. The device of claim 8 in which the membrane is a ceramic membrane.

11. The device of claim 1, wherein said device has a bottom end face and further comprises a shroud extending below said bottom end face and defining with said bottom end face a cavity, and wherein gas from said gas sparger is sparged into said cavity.

12. The device of claim 1 in which the hydraulic diameter of said passageways is from about 4 to about 15 mm.

13. The device of claim 1 in which the hydraulic diameter of said monolith segment or segments is greater than about 50 mm.

14. A submerged airlift membrane bioreactor, comprising:
    the membrane device of claim 1;
    a membrane bioreactor feed tank with means of liquid feed stock introduction; and
    a means to convey the filtrate from the filtrate collection zone of the device to the filtrate discharge point of the bioreactor.

15. The bioreactor of claim 14 in which the membrane device is installed within the bioreactor feed tank in an internal airlift circulation loop.

16. The bioreactor of claim 14 in which the membrane device is installed external to the feed tank in an external airlift circulation loop.

17. The bioreactor of claim 14 in which the sparged gas is air or oxygen and the bioreactor operates under aerobic conditions.

18. The bioreactor of claim 14 in which the sparged gas has low or negligible oxygen content and the bioreactor operates under anaerobic conditions.

* * * * *

UNITED STATES PATENT AND TRADEMARK OFFICE
CERTIFICATE OF CORRECTION

PATENT NO. : 6,767,455 B2
APPLICATION NO. : 10/261107
DATED : July 27, 2004
INVENTOR(S) : Robert L. Goldsmith It is certified that error appears in the above-identified patent and that said Letters Patent is hereby corrected as shown below:

In the Drawings:

Please delete Figure 1, Figure 4 and Figure 5 and replace them with the attached Replacement Drawings.

Signed and Sealed this

Twentieth Day of March, 2007

JON W. DUDAS
*Director of the United States Patent and Trademark Office*